June 6, 1961
O. RIEMER
2,987,178
ART OF CHECKING FILLED CONTAINERS
Filed Oct. 25, 1956
3 Sheets-Sheet 1
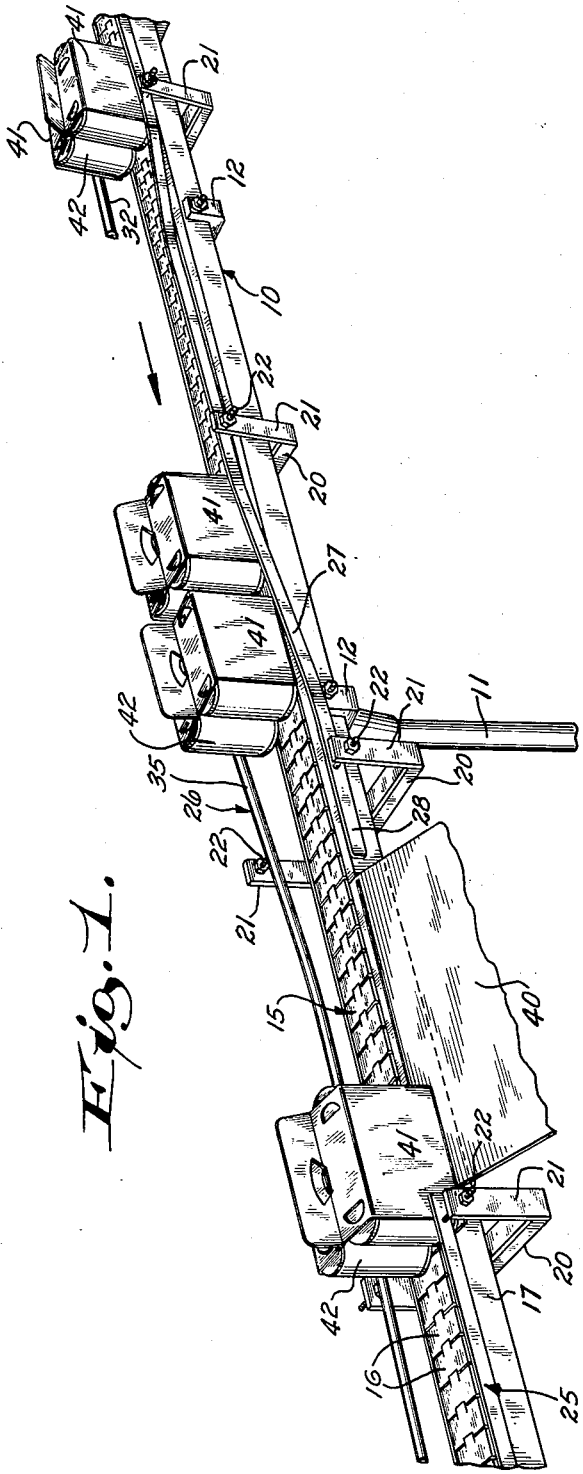
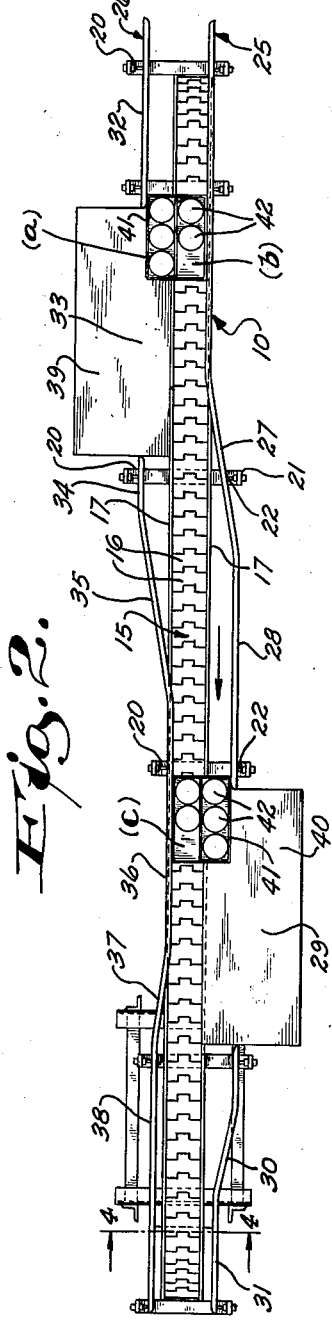
INVENTOR.
Oskar Riemer
BY
ATTORNEYS.

June 6, 1961  O. RIEMER  2,987,178
ART OF CHECKING FILLED CONTAINERS
Filed Oct. 25, 1956  3 Sheets-Sheet 2

INVENTOR.
Oskar Riemer
BY
ATTORNEYS.

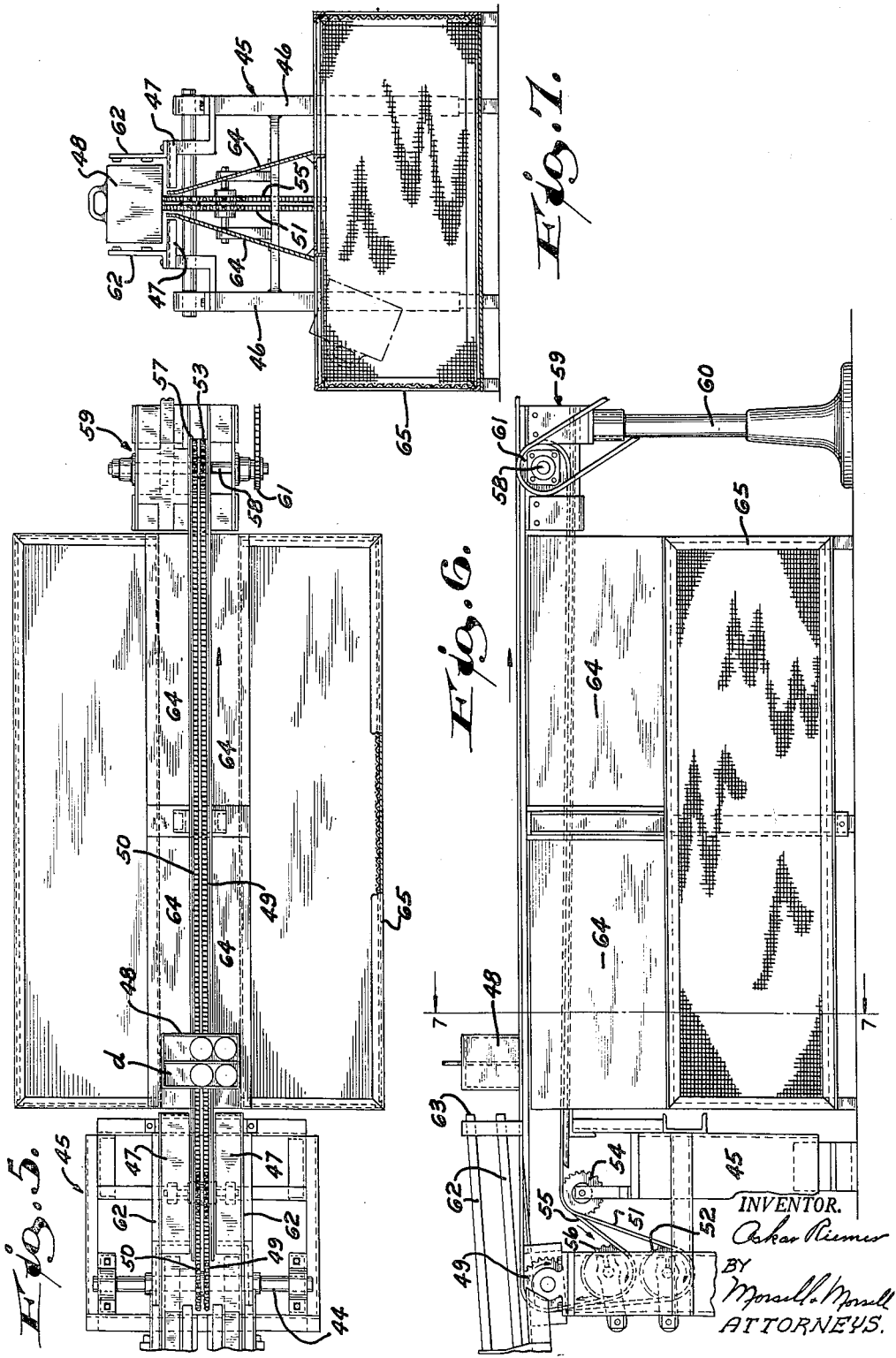

United States Patent Office 2,987,178
Patented June 6, 1961

2,987,178
ART OF CHECKING FILLED CONTAINERS
Oskar Riemer, Milwaukee, Wis., assignor to Miller Brewing Company, Milwaukee, Wis., a corporation of Wisconsin
Filed Oct. 25, 1956, Ser. No. 618,395
7 Claims. (Cl. 209—72)

This invention relates to improvements in the art of checking filled containers.

When individually packaged items are packed in outer containers, it not infrequently happens that one or more of the items will be missing from a particular container. This occurs most frequently when there is mechanical container assembling and filling equipment. In the brewery industry, six-pack cartons are common for canned beer, and automatic equipment is used to assemble the cartons around the six cans. Every now and then, however, one of the cans will be missing from a carton.

Heretofore it has been common to either weigh the cartons in order to determine whether they have been properly filled with cans, or else to utilize an expensive electronic detector.

It is a general object of the present invention to provide apparatus employing an over-balancing principle for detecting shortages in cartons while they are being conveyed, and for automatically rejecting any such carton, without slowing the production line.

A more specific object of the invention is to provide a filled container checking method and apparatus wherein an endless conveyor is employed which is of less width than the filled carton, the carton being permitted to fall laterally off of the conveyor when there is an unbalanced condition in the carton due to a shortage.

A still further object of the invention is to provide an apparatus as above described, wherein a shortage on one side of the carton is first checked, and subsequently a shortage on the opposite side.

A further object of the invention is to provide method and apparatus as above described wherein cartons may be checked in two stages—first, while the cartons are disposed in one direction with respect to the length of a checking conveyor, and then when they are disposed in a direction at right angles to their former position.

A further object of the invention is to provide a container checking mechanism including apparatus wherein an endless conveyor is employed on which six-pack cartons are disposed to extend transversely of the conveyor, with a portion of each carton overhanging one side of the conveyor and an opposite portion overhanging the other side of the conveyor an equal amount, the carton being balanced on the conveyor when properly filled, but being permitted to fall laterally from one side or the other when one or more items is missing from either of said overhanging sides.

Other objects of the invention are to provide filled container checking apparatus which is relatively inexpensive, simple to construct, foolproof in operation, and which can operate while the cartons are being conveyed without in any way slowing down the production line.

With the above and other objects in view, the invention consists of the improved filled container checking apparatus, and all of its parts and combinations as set forth in the claims, and all equivalents thereof.

In the accompanying drawings, in which the same reference numerals designate the same parts in all of the views:

FIG. 1 is a perspective view illustrating one exemplification of apparatus suitable for carrying out the present invention;

FIG. 2 is a plan view showing the preferred embodiment of the apparatus;

FIG. 5 is a plan view of a filled container checking apparatus in which the cartons are disposed at right angles to the conveyor with equal carton portions overhanging both sides of the conveyor, parts being broken away;

FIG. 6 is a side elevational view of the apparatus of FIG. 5; and

FIG. 7 is a transverse sectional view taken on the line 7—7 of FIG. 6.

Figure 3:
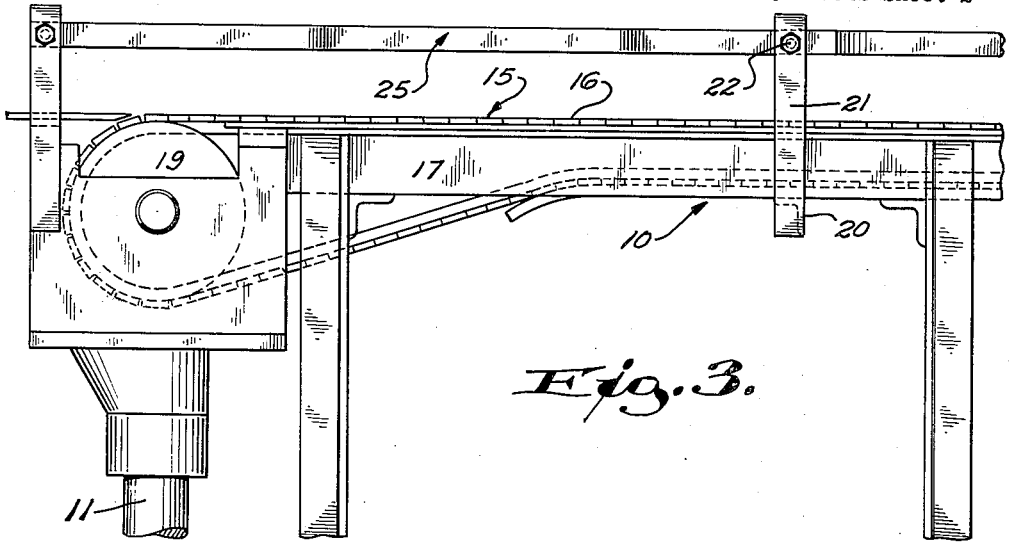
FIG. 3 is a fragmentary elevational view of the left-hand end of the apparatus of FIG. 2.
Figure 4:
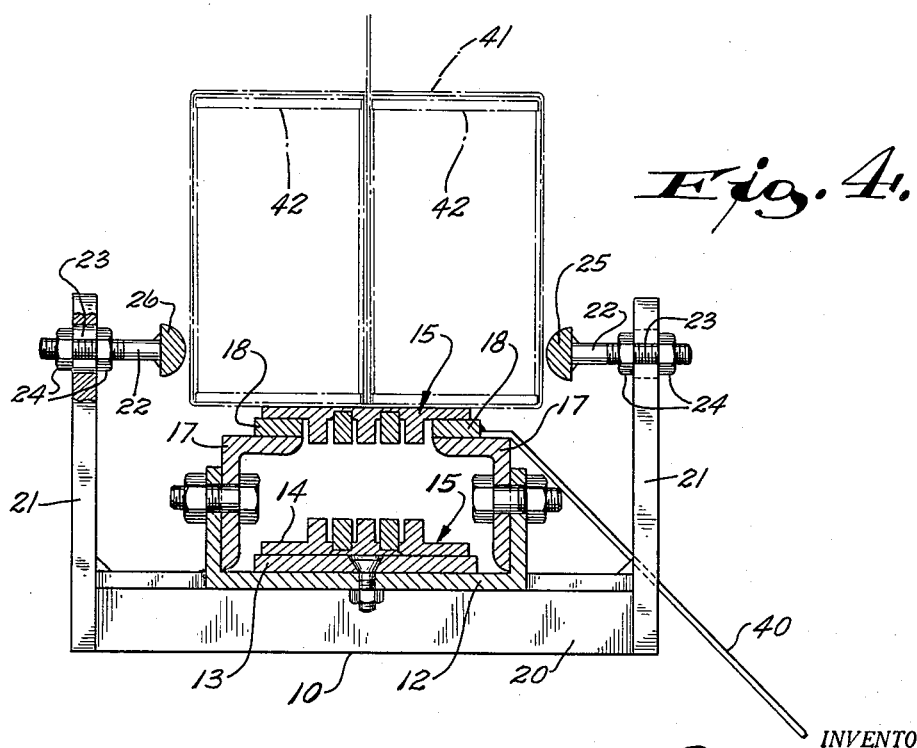
FIG. 4 is a sectional view taken on the line 4—4 of FIG. 2, a filled carton being shown on the conveyor in dot-and-dash lines.

Referring more particularly to the drawings, the numeral 10 designates in general the framework for the checking apparatus, which framework is supported on suitable legs 11. The frame includes longitudinally spaced U-brackets 12 suitably secured to the framework, which brackets support an elongated strip of metal 13 which forms a slidable support for the bottom stretch 14 of an endless conveyor belt or chain 15, the latter being of any suitable type. It may include pivotally connected links 16, as shown. Also supported by the U-brackets are laterally spaced longitudinally extending angle members 17, having horizontal upper flanges which support wear strips 18, the latter supporting the upper stretch of the conveyor 15, as shown in FIG. 4. The endless conveyor may pass around suitable rotatably mounted sprocket wheels such as the sprocket wheel 19 as shown in FIG. 3, one of which may be driven.

Extending transversely beneath the angle members 17 and suitably secured at longitudinally spaced intervals thereto are brackets 20. Each of the brackets 20 has upstanding arms 21 at its ends, one on each side the conveyor. A threaded adjustment stud 22 is adjustably received in a hole 23 near the upper end of each of the arms. These studs may be adjustably secured in position by nuts 24 as shown in FIG. 4. The inner ends of the studs are welded or otherwise secured to guide rails 25 on one side, and 26 on the other side, which are preferably half-round in cross-section.

Referring now to FIG. 2 it will be noted that at the right-end end of the figure the guide rail 25 extends along substantially in registration with the adjacent edge of the conveyor belt and then angles obliquely outwardly from said edge as at 27 and then extends parallel to the edge but spaced substantially outwardly therefrom as at 28. There is then a gap 29 where there is a break in the guide rail on this side of the apparatus. Thereafter the guide rail continues for a distance parallel to the edge of the conveyor but spaced outwardly therefrom, in alignment with the section 28, and then extends parallel to the edge of the conveyor, but spaced somewhat outwardly therefrom as at 31.

Going back again to the right-hand end of FIG. 2, the guide rail 26 on the other side extends parallel to the adjacent edge of the conveyor but is spaced a substantial distance outwardly therefrom as at 32. There is then a gap 33 in the guide rail 26, and the guide rail then continues again as at 34 in substantial alignment with the section 32. Most of the gap 33 is opposite a part of the conveyor where the guide rail 25 is substantially in registration with the adjacent edge of the conveyor, but part of the outwardly angled section 27 is also opposite the gap 33. The guide rail 26 then angles obliquely inwardly toward the adjacent edge of the conveyor as at 35 and then extends for a substantial distance as at 36 in approximate registration with the adjacent edge of the conveyor. A substantial portion of the guide rail section 36 is opposite the gap 29. Thereafter the guide rail 26 angles obliquely outwardly as at 37 and then extends straight once more as at 38, with the section 38 spaced a short distance outwardly from the edge the same as the spacing of the section 31 on the other side.

Projecting angularly outwardly and downwardly to the floor beneath the gap 33 is a drop-off carton rejection slide 39, and projecting angularly outwardly and downwardly to the floor beneath the gap 29 is a second drop-off carton rejection slide 40.

In the portion of the apparatus just described, if a can is missing from both sides of the carton, in other words, if there is a vacancy at (c) as well as at (b), referring to FIG. 2, then there will be no overbalanced condition, and the two missing cans will not be detected. While this does not occur frequently, nevertheless in large breweries it is desirable to make a double check. Accordingly, the apparatus shown in FIGS. 5, 6 and 7 is employed either before or after the cartons have been run on the apparatus of FIGS. 1 and 2, but preferably after.

Referring first to FIGS. 5 and 7, the numeral 45 designates in general the framework at the inlet end of the apparatus, which framework includes legs 46 suitably supporting spaced table portions 47 onto which filled cartons 48 are fed by any suitable means so that the cartons are disposed with their longitudinal axes at right angles to the line of travel. Suitably supported below the table on a rotatably mounted transverse shaft 44 are sprocket wheels 49 and 50. An endless conveyor chain 51 is adapted to travel around a suitably supported idler sprocket 52, around the sprocket 49, around a sprocket 53 at the opposite end of the apparatus, and back again over one of a pair of idler sprockets 54. A companion conveyor chain 55 travels over the other one of the idler sprockets 54, around a sprocket wheel 56, around the sprocket wheel 50, and around a sprocket wheel 57 at the opposite end of the machine, the latter being mounted rigidly on the same shaft 58 which carries the sprocket wheel 53. The shaft 58 is suitably journaled transversely of a frame portion 59, and the latter is supported on legs 60. One of the ends of the shaft 58 carries a sprocket wheel 61 which may be driven from any suitable source of power to cause movement of the chains 51 and 55 in the direction indicated by the arrows.

During the first part of their travel the portions of the cartons 48 which overhang the sides of the conveyor chains are supported over the spaced table portions 47 between guide rails 62. The guide rails, however, terminate as at 63, FIG. 6, as do the table portions 47. Thereafter the cartons are medially balanced on the pair of endless chains 51 and 55 which engage the cartons below the two center cans. Thus there is a carton portion containing one pair of cans overhanging one side of the conveyor chains, and a carton portion containing another pair of cans overhanging the other side of the conveyor chains.

Extending downwardly from the conveyor chains 51 and 55 at this portion of the device are inclined slides 64 as shown in FIGS. 5, 6 and 7, which lead to a reject basket 65, below, there being an open space on each side of the conveyor to allow rejected cartons to fall from the conveyor. After the conveyor carries the containers for the length of the basket, if they have not been rejected, they pass onto the frame portion 59 from which they may be removed or suitably fed to another location.

*Operation*

While the device is suitable for use in conjunction with any type of container for individually packaged items, nevertheless the drawing shows its use in connection with six-pack cartons 41 for cans 42 containing liquid such as beer. These cartons contain three cans 42 on one side and three cans on the other side. The filled cartons are delivered in the direction indicated by the arrows to the right-hand end of the apparatus shown in FIGS. 1 and 2 by any suitable in-feed conveyor, and are deposited between the guides 25 and 26 as shown at the right-hand ends of FIGS. 1 and 2, with the longitudinal center line of the carton about ¼" inwardly from the adjacent edge of the conveyor 15, leaving nearly one-half of the width of a carton in an overhanging position with respect to the conveyor 15 such as is indicated by the overhanging side (a) in FIG. 2. As long as the carton is confined between the rails 25 and 26 it will, of course, be moved along by the conveyor 15. When, however, the carton having the overhanging side (a) leaves the end of the rail section 32 so as to be within the gap 33, it will no longer have any rail support for the overhanging side. If the carton has been properly filled with six cans it will travel the length of the gap 33 and will remain in proper position on the moving conveyor 15. If, however, one of the cans from the row which is directly over the conveyor links 16 is missing, as indicated at (b) in FIG. 2, then as soon as the carton passes the end of the rail section 32 the three cans on the over-hanging side will over-balance the two cans over the conveyor and cause the carton to fall onto the rejection slide 39.

If, however, the can which is missing is in the overhanging side of a carton, the carton, of course, will not drop off onto the rejection slide 39, but will continue to be carried along by the conveyor 15 between the guide rail sections 27 and 35 and 28 and 36 until such carton arrives at the position shown near the left of FIG. 2, where the missing can (c) is now in the row which is directly over the conveyor 15, the other row of cans being guided to overhanging position by the shift in the position of the guide rails. As soon as this carton leaves the end of the guide rail section 28 the three cans in the overhanging part will, of course, overbalance the carton and cause it to drop onto the rejection slide 40. Thus the gap 33 and slide 39 take care of cartons having a missing can in one side, and the gap 29 and slide 40 take care of cartons having a missing can in the other side. In normal operations the majority of cartons will be properly filled, and all properly filled cartons will proceed past both gaps without dropping off. The bolts 22 which support the guide rails 25 and 26 are adjusted through manipulation of the nuts 24 to vary the exact position of the guide rails 25 and 26 so as to create proper performance and to insure that properly filled cartons do not drop off into the gaps.

As before mentioned, if a can is missing from each of the rows of the same carton in FIG. 2—that is, if a can is missing at (c) and also at (b), then there will be no unbalanced condition and the fact that there are missing cans will not be detected. Therefore, it is desirable to employ a double check and to pass the cartons, either before or after passage through the apparatus of FIG. 1, through the apparatus of FIGS. 5, 6 and 7, preferably after.

When a carton passes through the apparatus of the latter figures, it is positioned to extend transversely of the line of travel of the chains 51 and 55, as shown in FIG. 5. In the case of six-pack beer cartons, a portion of the carton with two cans will overhang one side of the conveyor chains, and an opposite portion of the carton with two cans will overhang the other side. The middle two cans will be directly over the conveyor chains. If, however, one or both cans is missing as shown at (d) in FIG. 5, there will be an unbalanced condition and the carton will tumble off of the conveyor chains and slide down the slide 64 into the basket 65. If one or both of the cans is missing from the side of the carton opposite (d) the carton will tumble in a reverse direction onto a slide 64 and into the basket 65. If both of the cans overhanging one side of a carton are missing, the carton will, of course, be rejected so that conditions which are not detected by the apparatus of FIGS. 1 and 2 will be taken care of by the apparatus of FIGS. 5, 6 and 7, except that if both of the center cans of FIG. 5 are missing, then neither of the apparatuses of FIGS. 1 or 5 will function to reject the carton. To have both of the center cans missing, however, is a very unusual condition.

It is apparent from the above that a very simple form of checking device has been provided which is relatively inexpensive and which can be inserted in a moving line for filled containers without in any way slowing up the movement thereof. It is obvious that the device may be adjusted to take care of cartons of various types and to meet a variety of conditions which are encountered in connection with various products.

Various other changes and adaptations may be made without departing from the spirit of the invention, and all such changes are contemplated as may come within the scope of the claims.

What I claim is:

1. In apparatus for checking filled containers, a conveyor belt on which the filled containers are supported for movement in line formation, guiding means including a guiding rail along each side of the conveyor with the rails extending in the same general direction and spaced apart a distance to just accommodate the width of a container therebetween while allowing it to travel with the conveyor between said rails, part of said guiding means being positioned eccentrically with respect to the width of the conveyor with one rail spaced outwardly from the edge of the conveyor to guide the containers with part in laterally overhanging relationship with respect to a side of the conveyor, said rail maintaining all containers on the conveyor there being a gap in said outwardly spaced rail through which a container may drop when a missing item within the container results in an over-balanced condition in the direction of said gap, said eccentrically positioned guiding means part being so positioned with respect to the width of the conveyor that properly filled containers proceed without being affected by the gap.

2. In apparatus for checking filled containers, a conveyor belt on which filled containers are supported for movement in line formation, guiding means including a guiding rail along each side of the conveyor with the rails extending in the same general direction and spaced apart a distance to just accommodate the width of a container therebetween while allowing it to travel with the conveyor between said rails, said guiding means having a part including an outer guide rail which is laterally outwardly offset with respect to the width of the conveyor to guide the containers with part in laterally overhanging relationship with respect to a side of the conveyor, said rail maintaining all containers on the conveyor, there being a gap in said outer guide rail of the outwardly offset part of said guiding means through which a container may drop when a missing item within the container results in an over-balanced condition, the amount of offset of the guiding means being such with respect to the width of the conveyor that properly filled containers proceed without being affected by the gap.

3. In apparatus for checking filled containers, a conveyor for moving the filled containers in line formation, guiding means adjacent the conveyor including rails spaced apart just enough to accommodate the width of a container while allowing it to travel with the conveyor between the rails, which guiding means is laterally offset with respect to the width of the conveyor for guiding the containers first with one rail in laterally overhanging relationship with respect to one side of the conveyor and then with the other rail in laterally overhanging relationship with the other side of the conveyor, said rails maintaining all containers on the conveyor, there being a gap in one rail of a laterally offset part of said guiding means positioned to allow a container to fall therethrough to one side of the conveyor when a missing item in a container results in an over-balanced condition on said side of the container, and there being a gap in the other rail of a part of said guiding means which is laterally offset in the opposite direction through which a container may fall when a missing item in the container results in an over-balanced condition on the other side of said container, the amount of offset of said guiding means being such that properly filled containers proceed without being affected by either gap.

4. In apparatus for checking filled containers, a conveyor belt on which filled containers are supported for movement in line formation, guiding means including a guiding rail along each side of the conveyor with the rails extending in the same general direction and spaced apart a distance to just accommodate the width of a container therebetween while allowing it to travel with the container between said rails, said guiding means being laterally offset with respect to the width of the conveyor to guide the containers first with one side in laterally overhanging relationship with respect to one side of the conveyor and then with the other side in laterally overhanging relationship with the other side of the conveyor, said rails maintaining all containers on the conveyor, there being a gap in a rail on one side of said guiding means positioned to allow an overhanging container to fall therethrough to one side of the conveyor when a missing item in said container results in an over-balanced condition on said side of the container, and there being a gap in the rail on the other side of said guiding means through which an overhanging container may fall when a missing item in the container results in an over-balanced condition on the other side of said container, the amount of offset of said guiding means being such that properly filled containers proceed without being affected by either gap.

5. In apparatus for checking filled containers, a conveyor for moving the filled containers in line formation and of substantially less width than the transverse dimension of the containers thereon, a pair of rails supported in a position adjacent said conveyor and spaced apart a distance greater than the width of the conveyor and a distance to just accommodate the width of a container therebetween while allowing it to travel with the conveyor while between said rails with part of the container in laterally overhanging relationship with respect to a side of the conveyor, there being an extent of the conveyor wherein at least one of said rails has a gap through which a container may drop when a missing item within the container results in an overbalanced condition in the direction of said gap.

6. A method of checking six pack beer cartons or the like having parallel rows of items comprising first positioning moving cartons one after another on an elevated conveyor which is of approximately the width of one row of items in such a manner that one side of each carton containing another row of items overhangs one side of the conveyor an amount insufficient to cause an unbalanced condition if the carton has been properly filled, and sufficient to cause an unbalanced condition if there is a shortage in a carton, then laterally shifting the cartons on the conveyor so that the opposite side of each carton overhangs the opposite side of the conveyor, so that unbalanced cartons will fall by gravity from one side of the conveyor or the other.

7. A method of checking six pack beer cartons or the like having parallel rows of items comprising first positioning moving cartons to extend in one direction on an elevator conveyor which is of approximately the width of one item in such a manner that one side of each carton overhangs one side of the conveyor an amount insufficient to cause an overbalanced condition if the carton has been properly filled and sufficient to cause an overbalanced condition if there is a shortage in a carton, then laterally shifting the cartons on the conveyor so that the opposite side of each carton overhangs the opposite side of the conveyor, and then positioning moving cartons at right angles to their former position on an endless conveyor which is of substantially the same width as an item in such a manner that portions of each carton overhang both sides of the conveyor equally so that the carton is in balance if it has been properly filled and becomes overbalanced if there is a shortage in either overhanging side, so that overbalanced cartons will fall from the conveyors by gravity.

References Cited in the file of this patent

UNITED STATES PATENTS

| | | |
|---|---|---|
| 1,784,540 | Ripley | Dec. 9, 1930 |
| 2,038,652 | Froehlich | Apr. 28, 1936 |